United States Patent
Sun et al.

(10) Patent No.: US 9,985,326 B2
(45) Date of Patent: May 29, 2018

(54) METHOD FOR MANUFACTURING A LITHIATED METAL-CARBON COMPOSITE ELECTRODE, LITHIATED METAL-CARBON COMPOSITE ELECTRODE MANUFACTURED THEREBY, AND ELECTROCHEMICAL DEVICE INCLUDING THE ELECTRODE

(75) Inventors: Yang-Kook Sun, Seoul (KR); Bruno Scrosati, Rome (IT); Dong Ju Lee, Changwon-si (KR); Jusef Hassoun, Rome (IT); Sung Man Lee, Chuncheon-si (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 1326 days.

(21) Appl. No.: 14/652,656

(22) PCT Filed: Feb. 13, 2012

(86) PCT No.: PCT/KR2012/001075
§ 371 (c)(1),
(2), (4) Date: Jul. 30, 2015

(87) PCT Pub. No.: WO2012/108741
PCT Pub. Date: Aug. 16, 2012

(65) Prior Publication Data
US 2015/0333385 A1    Nov. 19, 2015

(30) Foreign Application Priority Data

Feb. 11, 2011 (KR) .......................... 10-2011-0012436
Mar. 29, 2011 (KR) .......................... 10-2011-0028246
Feb. 13, 2012 (KR) .......................... 10-2012-0014186

(51) Int. Cl.
| | |
|---|---|
| H01M 4/134 | (2010.01) |
| H01M 4/1395 | (2010.01) |
| H01M 4/04 | (2006.01) |
| H01M 4/1393 | (2010.01) |
| H01M 4/133 | (2010.01) |
| H01M 4/36 | (2006.01) |
| H01M 12/08 | (2006.01) |
| H01M 4/38 | (2006.01) |
| H01M 10/05 | (2010.01) |
| H01M 4/62 | (2006.01) |
| H01M 10/052 | (2010.01) |
| H01M 10/39 | (2006.01) |

(52) U.S. Cl.
CPC .......... *H01M 12/08* (2013.01); *H01M 4/043* (2013.01); *H01M 4/0404* (2013.01); *H01M 4/0471* (2013.01); *H01M 4/133* (2013.01); *H01M 4/134* (2013.01); *H01M 4/1393* (2013.01); *H01M 4/1395* (2013.01); *H01M 4/364* (2013.01); *H01M 4/366* (2013.01); *H01M 4/386* (2013.01); *H01M 10/05* (2013.01); *H01M 4/622* (2013.01); *H01M 4/625* (2013.01); *H01M 4/626* (2013.01); *H01M 10/052* (2013.01); *H01M 10/39* (2013.01); *H01M 2300/0028* (2013.01); *Y02E 60/128* (2013.01); *Y10T 156/10* (2015.01)

(58) Field of Classification Search
CPC combination set(s) only.
See application file for complete search history.

(56) References Cited

U.S. PATENT DOCUMENTS 6,391,492 B1 * 5/2002 Kawakami .............. H01M 2/14
                                                                 29/623.1

FOREIGN PATENT DOCUMENTS

| JP | 2008508671 A | 3/2008 |
|---|---|---|
| KR | 100291067 B1 | 3/2001 |
| KR | 1020100012761 A | 2/2010 |
| WO | 2009009206 A2 | 1/2009 |

OTHER PUBLICATIONS

Moni Kanchan Datta, et al; In situ electrochemical synthesis of lithiated silicon-carbon based composites anode . . . ; Journal of Power Sources; vol. 194; 2009; pp. 1043-1052.
International Search Report dated Oct. 19, 2012 for PCT/KR2012/001075 and English translation.

* cited by examiner

*Primary Examiner* — Ladan Mohaddes
(74) *Attorney, Agent, or Firm* — Lucas & Mercanti, LLP

(57) ABSTRACT

The present invention relates to a method for manufacturing a lithiated metal-carbon composite electrode, a lithiated metal-carbon composite electrode manufactured thereby, and an electrochemical device including the electrode. More particularly, the present invention relates to a method for manufacturing a lithiated metal-carbon composite electrode with a new structure having excellent charge/discharge and cycle characteristics, a lithiated metal-carbon composite electrode manufactured thereby, and an electrochemical device including the electrode. In the lithiated metal-carbon composite electrode, lithium is alloyed with a metal and is inserted into a crystal structure of carbon to form the composite having a stable structure. Thus, a volume of the metal is slightly varied, so a cycle characteristic may not be deteriorated and charge/discharge capacities may be improved. The lithiated metal-carbon composite electrode may control an irreversible capacity during initial charging/discharging and may be substituted for an unsafe lithium metal anode.

16 Claims, 7 Drawing Sheets

METHOD FOR MANUFACTURING A LITHIATED METAL-CARBON COMPOSITE ELECTRODE, LITHIATED METAL-CARBON COMPOSITE ELECTRODE MANUFACTURED THEREBY, AND ELECTROCHEMICAL DEVICE INCLUDING THE ELECTRODE

CROSS-REFERENCE TO RELATED APPLICATIONS

This application is a 371 of PCT/KR2012/001075, filed Feb. 13, 2012, which claims the priority from Korean Patent Application No. 10-2011-0012436, filed Feb. 11, 2011, Korean Patent Application No. 10-2011-0028246, filed Mar. 29, 2011 and Korean Patent Application No. 10-2012-0014186, filed Feb. 13, 2012, the contents of each of which are incorporated herein by reference.

TECHNICAL FIELD

The present invention relates to a method for manufacturing a lithiated metal-carbon composite electrode, a lithiated metal-carbon composite electrode manufactured thereby, and an electrochemical device including the electrode. More particularly, the present invention relates to a method for manufacturing a lithiated metal-carbon composite electrode with a new structure having excellent charge/discharge characteristic and cycle characteristic, a lithiated metal-carbon composite electrode manufactured thereby, and an electrochemical device including the electrode.

BACKGROUND ART

Recently, portable electronic products such as a camcorder, a portable phone and a notebook personal computer have been generally used with the rapid development of electronic, communication and computer industries, so light, long-lifetime and high-reliable batteries have been demanded.

In particular, secondary batteries such as nickel-hydrogen (Ni-MH) secondary batteries and lithium secondary batteries have been markedly demanded. In particular, the lithium secondary batteries using lithium and a non-aqueous solvent electrolyte can be realized as batteries having small, light and high-energy density characteristics, so they are actively being developed.

Generally, the lithium secondary battery is formed using a transition metal oxide (e.g., $LiCoO_2$, $LiNiO_2$, or $LiMn_2O_4$) as a cathode material, using lithium metal or carbon as an anode material, and using an organic solvent containing lithium ions as an electrolyte disposed between the two electrodes.

If the lithium secondary battery using the lithium metal as the anode is repeatedly charged and discharged, dendrite may be easily generated to cause an electrical short. Thus, a lithium secondary battery using a carbonized or graphitized carbon material as the anode and using the non-aqueous solvent as the electrolyte has been commercialized.

However, the graphitized carbon material may have a theoretical lithium storage capacity of 372 mAh/g, which corresponds to 10% of a theoretical capacity of the lithium metal. In other words, the graphitized carbon material has a very small capacity. Thus, researches have been conducted for materials having a greater lithium storage capacity than graphite.

A silicon-based material has been spotlighted because of its high capacity (4200 mAh/g). However, a volume variation (shrinkage or expansion) of the silicon occurs during insertion/de-insertion of lithium ions, so the mechanical stability of the silicon may be deteriorated. This means that a cycle characteristic of the battery is deteriorated. Thus, it is required to develop materials capable of improving structural stability and a cycle characteristic when used as an active material of an electrochemical device.

Recently, to solve these problems, researches have been focused on development of metal alloy-based anode materials capable of having a higher capacity and an excellent lifetime characteristic and of being substituted for a conventional carbon-based anode or lithium metal anode. Capacities of metal alloy-based anode materials such as tin (Sn), silicon (si) and germanium (Ge) may be two or more times greater than that of the conventional carbon-based material. However, since performance of the electrochemical device using the metal alloy-based anode active material is greatly affected by a manufacturing method or a structure of the composite, it is required to develop a new manufacturing method capable of improving the performance of the electrochemical device.

DISCLOSURE OF THE INVENTION

Technical Problem

The present invention provides a method for manufacturing a lithiated metal-carbon composite electrode and a lithiated metal-carbon composite electrode manufactured thereby.

The present invention also provides an electrochemical device including the lithiated metal-carbon composite electrode.

Technical Solution

An embodiment of the present invention provides a method for manufacturing a lithiated metal-carbon composite electrode. The method includes:

preparing a metal-carbon composite;

mixing the metal-carbon composite, a conductive material, and a binder with a solvent to form slurry and coating a collector with the slurry;

stacking lithium on the collector coated with the slurry including the metal-carbon composite; and applying a pressure to the collector, on which the lithium is stacked, while adding a solution to the collector.

Hereinafter, the method for manufacturing a lithiated metal-carbon composite electrode will be described in more detail.

In an embodiment of the present embodiment, the metal-carbon composite is prepared in a first step. The first metal-carbon composite may be a composite of carbon and a metal selected from a group consisting of Mg, Ca, Al, Si, Ge, Sn, Pb, As, Bi, Ag, Au, Zn, Cd, and Hg. In an embodiment of the present embodiment, the metal-carbon composite may be a silicon-carbon composite or a tin-carbon composite.

In the present embodiment, the method for manufacturing the metal-carbon composite is not limited to a specific case but may use a general manufacturing method. For example, gen of resorcinol and formaldehyde may be manufactured by the process disclosed in Italian Patent application NO. RM2008A000381, and a tin-organic precursor may be immersed in the gel. Thereafter, a thermal treatment may be performed to form the tin-carbon composite.

In a second step, the metal-carbon composite, the conductive material, and a binder may be mixed with the solvent to form the slurry, and the collector may be coated with the slurry.

The binder may use, but not limited to, poly(vinylidenefluoride), polyvinyl alcohol, carboxymethyl cellulose, hydroxyl propyl cellulose, diacetyl cellulose, polyvinyl chloride, carboxylated polyvinyl chloride, polyvinyl fluoride, a polymer including ethylene oxide, polyvinyl pyrrolidone, polyurethane, polytetrafluoroethylene, polyethylene, polypropylene, styrene-butadiene rubber, acrylated styrene-butadiene rubber, an epoxy resin, or nylon.

The conductive material may include a material that does not cause a chemical change but has electrical conductivity. For example, the conductive material may include a carbon-based material (e.g., natural graphite, synthetic graphite, carbon black, acetylene black, ketjen black, or carbon fiber), a metal-based material (e.g., metal powder or metal fiber such as copper, nickel, aluminum, or silver), a conductive polymer (e.g., polyphenylene derivatives), or any mixture thereof.

When the slurry is manufactured, a content of the metal-carbon composite may be in a range of 60 wt % to 90 wt % with respect to an entire weight of a solid. In addition, a content of the binder may be in a range of 5 wt % to 20 wt %, and a content of the conductive material may be in a range of 50 wt % to 20 wt %.

The current collector may be selected from a group consisting of copper foil, nickel foil, stainless steel foil, titanium foil, nickel foam, copper foam, a polymer material coated with a conductive metal, and any combination thereof.

In a third step, lithium is stacked on the collector coated with the slurry including the metal-carbon composite. In the present invention, the lithium may have a sheet shape, and a thickness of the lithium may be equal to or greater than 50 µm. Since the lithium has the sheet shape, workability may be improved in the manufacturing process. In addition, the lithium having the thickness of 50 µm or more may be advantageous to lithiate the metal-carbon composite.

In a fourth step, the pressure is applied to the collector having the lithium while adding the solution. The solution may include a non-aqueous organic solvent and lithium salt dissolved in the non-aqueous organic solvent. If the solution including the non-aqueous organic solvent and the lithium salt is added, lithium ions may be easily transferred from the lithium metal to a surface and the inside of the metal-carbon composite.

The lithium salt may include at least one selected from a group consisting of $LiBF_4$, $LiClO_4$, $LiPF_6$, $LiAsF_6$, $LiCF_3SO_3$, $Li(CF_3SO_2)_2N$, $LiC_4F_9SO_3$, $Li(CF_3SO_2)_3C$, and $LiBPh_4$.

The non-aqueous organic solvent may include an organic solvent and an ionic solvent. The organic solvent may include at least one selected from a group consisting of ethylene carbonate (EC), propylene carbonate (PC), dimethyl carbonate (DMC), diethyl carbonate (DEC), ethyl methyl carbonate (EMC), 1,2-dimethoxyethane (DME), gamma-butyrolactone (GBL), tetrahydrofuran (THF), 1,3-dioxolan (DOXL), dimethyl ether (DEE), methyl propionate (MP), sulfolane (S), dimethylsulfoxide (DMSO), acetonitrile (AN), and tetraethyleneglycol dimethylether (TEGDME). The ionic solvent may include at least one selected from a group consisting of 1-ethyl-3-methylimidazolium (EMI)-(CF3SO2)2N, 1-butyl-3-methylimidazolium (BMI)-(CF3SO2)2N, 1-hexyl-3-methylimidazolium (HMI)-(CF3SO2)2N, 1-ethyl-3-methylimidazolium(EMI)-PF6, 1-butyl-3-methylimidazolium (BMI)-PF6, 1-hexyl-3-methylimidazolium(HMI)-PF6, 1-ethyl-3-methylimidazolium (EMI)-BF4, 1-butyl-3-methylimidazolium(BMI)-BF4, 1-hexyl-3-methylimidazolium(HMI)-BF4, 1-ethyl-3-methylimidazolium(EMI)-CF3SO3, 1-butyl-3-methylimidazolium(BMI)-CF3SO3, and 1-hexyl-3-methylimidazolium (HMI)-CF3SO3.

A concentration of the lithium salt may be in a range of 0.1M to 2.0M in the solution including the non-aqueous organic solvent and the lithium salt dissolved in the non-aqueous organic solvent. When the concentration of the lithium salt is included in this range, an ionic conductivity of the electrolyte may increase, so the lithium ions may be easily transferred to the metal-carbon composite. In other words, the formation of the lithiated metal-carbon composite may be accelerated.

In the present invention, the pressure applied to the collector having the lithium in the fourth step may be in a range in 300 $N/m^2$ to 3500 $N/m^2$.

If the pressure is applied to the collector on which the lithium is stacked, the lithium may be transferred from the stacked lithium to the metal-carbon composite, so a portion of the lithium may be alloyed with the metal and the rest of the lithium may be inserted into the carbon crystal structure.

If the pressure applied to the lithium is lower than 300 $N/m^2$, a lithiation time of the metal-carbon composite may be long. If the pressure applied to the lithium is greater than 300 $N/m^2$, it may be difficult to remove the lithium stacked for the lithiation again.

In the present invention, a method of applying the pressure to the collector is not limited to a specific method. In other words, after the lithium is stacked on the collector, a plate may be stacked thereon. Thereafter, a weight may be laid on the plate to uniformly apply the pressure to an entire portion of the collector. According to the present invention, the lithium may be provided to the metal-carbon composite by this physical method, so the lithiated metal-carbon composite electrode may be easily manufactured.

In the present invention, the method may further include removing the stacked lithium after applying the pressure to the collector on which the lithium is stacked.

An embodiment of the present invention also provides a lithiated metal-carbon composite electrode manufactured by the method of the present invention.

According to the present invention, in the lithiated metal-carbon composite electrode, a portion of the lithium and the metal may be formed into an alloy and the rest of the lithium may be inserted into a carbon crystal structure.

An embodiment of the present invention also provides an electrochemical device comprising the lithiated metal-carbon composite electrode manufactured by the method of the present invention. In the present invention, the lithiated metal-carbon composite electrode may be substituted for a conventional carbon-based anode.

The electrochemical device of the present invention may include: a cathode and/or an anode including the lithiated metal-carbon composite electrode; and a separator existing therebetween. In addition, the electrochemical device may further include an electrolyte impregnated in the cathode, the anode, and the separator. The electrolyte may be a liquid electrolyte or a polymer gel electrolyte.

The electrochemical device may be a lithium-sulfur battery, a lithium-air battery, or a lithium ion battery.

In the present invention, the electrochemical device may be a lithium-air battery including a polymer composite electrolyte or a liquid electrolyte.

In the present invention, the polymer composite electrolyte may include: a film formed of a first lithium salt and a polymer; and an ionic conductive solvent impregnated in the film. The ionic conductive solvent includes a second lithium salt and an organic solvent. The organic solvent may include tetraethyleneglycoldimethylether, ethylene glycoldimethacrylate, polyethylene glycol, polyethylene glycoldialkyl ether, polyalkylglycoldialkyl ether, or any combination thereof.

In the present invention, the liquid electrolyte may be expressed by a formula R1-(CR3 2CR4 2O)nR2. In the formula, where "n" is between 2 to 10, and each of "R1" and "R2" is independently selected from a group consisting of H, alkyl, cycloalkyl, aryl, heterocyclyl, heteroaryl, alkoxy, silyl, substituted alkyl, substituted cycloalkyl, substituted aryl, substituted heterocyclyl, substituted heteroaryl, substituted alkoxy, substituted silyl, and a halogen. In the present invention, each of "R3" and "R4" may be independently selected from a group consisting of H, a halogen, alkyl, cycloalkyl, aryl, substituted alkyl, and substituted aryl.

In the present invention, the liquid electrolyte may include tetraethyleneglycoldimethylether, ethylene glycoldimethacrylate, polyethylene glycol, polyethylene glycoldialkyl ether, polyalkylglycoldialkyl ether, or any combination thereof.

Advantageous Effects

In the lithiated metal-carbon composite electrode according to the present invention, lithium is alloyed with a metal and is inserted into a crystal structure of carbon to form a composite having a stable structure. As a result, a volume of the metal is slightly varied, so a cycle characteristic may not be deteriorated and charge/discharge capacities may be improved. In addition, the lithiated metal-carbon composite electrode may control an irreversible capacity during initial charging/discharging and may be substituted for an unsafe lithium metal anode.

BEST MODE FOR CARRYING OUT THE INVENTION

Hereinafter, exemplary embodiments of the present invention will be described in detail. However, it should be noted that the present invention is not limited to the following exemplary embodiments and may be implemented in various forms. Accordingly, the exemplary embodiments are provided only to disclose the present invention and let those skilled in the art know the category of the present invention.

EMBODIMENTS OF THE INVENTION

[Embodiment 1-1] Manufacture of Lithiated Silicon-Carbon Composite Electrode

A silicon-graphite composite having a particle size of 5 μm to 15 μm was prepared. The prepared silicon-graphite composite powder, super P, carboxymethyl cellulose (CMC), and styrene butadiene rubber (SBR) were mixed with each other at a weight ratio of 85:5:3.3:6.7 in N-methylpyrrolidone (NMP) to manufacture slurry. The slurry was casted on copper foil used as a collector. A casted slurry was first-dried in an oven at 110° C. for 2 hours and then was second-dried under vacuum for 12 hours to manufacture an electrode.

The manufactured electrode was cut to have a size of 2×2 cm$^2$, and a lithium (Li) metal was stacked on the electrode. Thereafter, the stacked lithium metal was coated with a solution including a mixture solvent (EC:DMC=3:7) and 1.2M LiPF$_6$ dissolved in the mixture solvent, and a pressure of 46 N/m$^2$ was applied to the stacked Li metal for a half hour to manufacture a lithiated silicon-carbon composite electrode.

Embodiments 1-2 to 1-7

A magnitude and an applying time of the pressure applied to the stacked Li metal was changed as shown in the following table 1 to obtain lithiated silicon-carbon composite electrodes. At this time, other conditions were the same as described in the embodiment 1-1.

TABLE 1

| Classification | Pressure (N/m$^2$) | Time (hr) |
| --- | --- | --- |
| Embodiment 1-1 | 46 | 0.5 |
| Embodiment 1-2 | 1588 | 0.5 |
| Embodiment 1-3 | 3130 | 0.5 |
| Embodiment 1-4 | 3130 | 1 |
| Embodiment 1-5 | 3130 | 3 |
| Embodiment 1-6 | 3130 | 6 |
| Embodiment 1-7 | 3130 | 12 |
| Comparison example 1 | — | — |
| Comparison example 2 | 7756 | 5 |

Comparison Example

The same method as in the embodiment 1-1 was performed except that the pressure was not applied to stacked lithium metal, so an electrode used as the comparison example 1 was manufactured.

The same method as in the embodiment 1-1 was performed except that the magnitude of the pressure applied to stacked lithium metal was 7756 N/m², so an electrode used as the comparison example 2 was manufactured.

[Experimental Example 1] XRD Measurement

Figure 1:
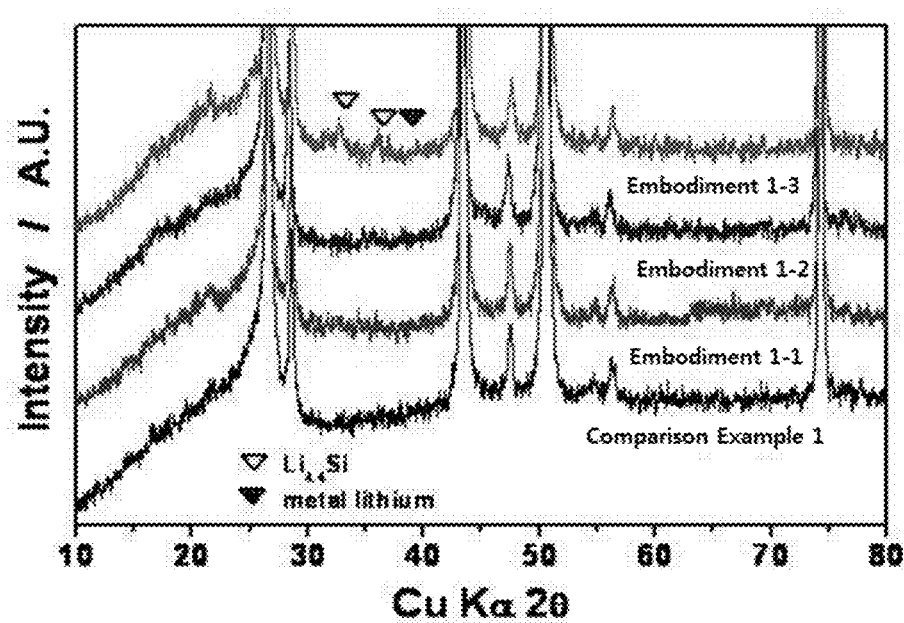
FIG. 1 shows x-ray direction (XRD) results of electrodes manufactured according to embodiments 1-1, 1-2 and 1-3 of the present invention and a comparison example 1.

The electrodes, where are manufactured in the embodiments 1-1 to 1-3 and the comparison example 1, were measured using the XRD, and the results were shown in FIG. 1.

As shown in FIG. 1, it is confirmed that an intensity of a peak showing lithium alloyed with silicon increases as the magnitude of the applied pressure increases when the applying time of the pressures is fixed to a half hour.

[Manufacture Example 1] Manufacture of Half-Cell Including Lithiated Silicon-Carbon Composite Electrode Half-cells including the lithiated silicon-carbon composite electrodes manufactured in the embodiments 1-1 to 1-7 were manufactured.

2032 coin-type cells using a lithium metal as an anode and using 1.2M LiPF6/EC:EMC (3:7, v/v) as an electrolyte were manufactured using the lithiated silicon-carbon composite electrodes manufactured in the embodiments 1-1 to 1-7.

Figure 2:
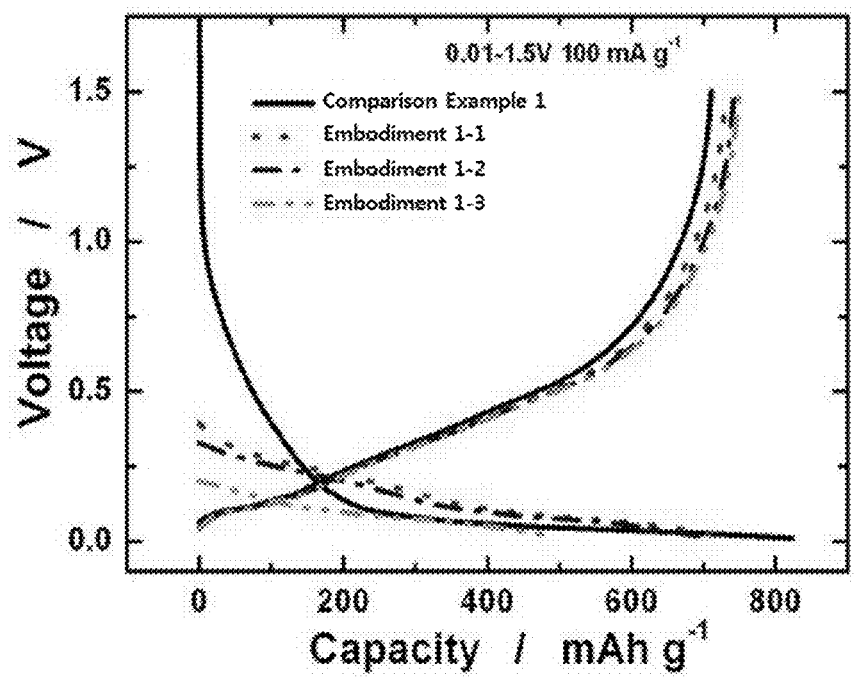
FIG. 2 shows measurement results of charge/discharge characteristics of lithiated silicon-carbon composite electrodes manufactured according to the embodiments 1-1, 1-2 and 1-3 of the present invention and the comparison example 1.

[Experimental Example 2] Measurement of Charge/Discharge Capacity of Half-Cell According to Magnitude of Pressure Applied for Lithiation The half-cells using the lithiated silicon-carbon composite electrodes of the embodiments 1-1 to 1-3 and the comparison example 1 as anodes were charged and then discharged between 0.01 V and 1.5 V under a condition of 100 mA g$^{-1}$, and the results were shown in FIG. 2. In the comparison example 2, the magnitude of the pressure applied for the lithiation was too great, so a lithium metal corresponding to an electrode was not separated.

As shown in FIG. 2, it is confirmed that an open circuit voltage (OCV) and a charge capacity are reduced according to the magnitude of the pressure applied during the lithiation. Thus, it is confirmed that lithium ions existed previously in the electrode. In addition, a ratio of a discharge capacity to the charge capacity increases as the pressure applied for the lithiation increases, and thus, the magnitude of the pressure applied for the lithiation may be controlled to adjust a lithiation degree of the lithiated silicon-carbon composite. As a result, an initial reversible capacity may be controlled.

[Experimental Example 3] Measurement of Charge/Discharge Capacity of Half-Cell According to Applying Time of Pressure for Lithiation The half-cells implemented with the lithiated silicon-carbon composite electrodes of the embodiments 1-4 to 1-7 were discharged and then charged between 0.01 V and 1.5 V under a condition of 100 mA g$^{-1}$, and the half-cell implemented with the lithiated silicon-carbon composite electrode of the comparison example 1 was charged and then discharged between 0.01 V and 1.5 V under a condition of 100 mA g$^{-1}$. The results were shown in FIG. 3.

Figure 3:
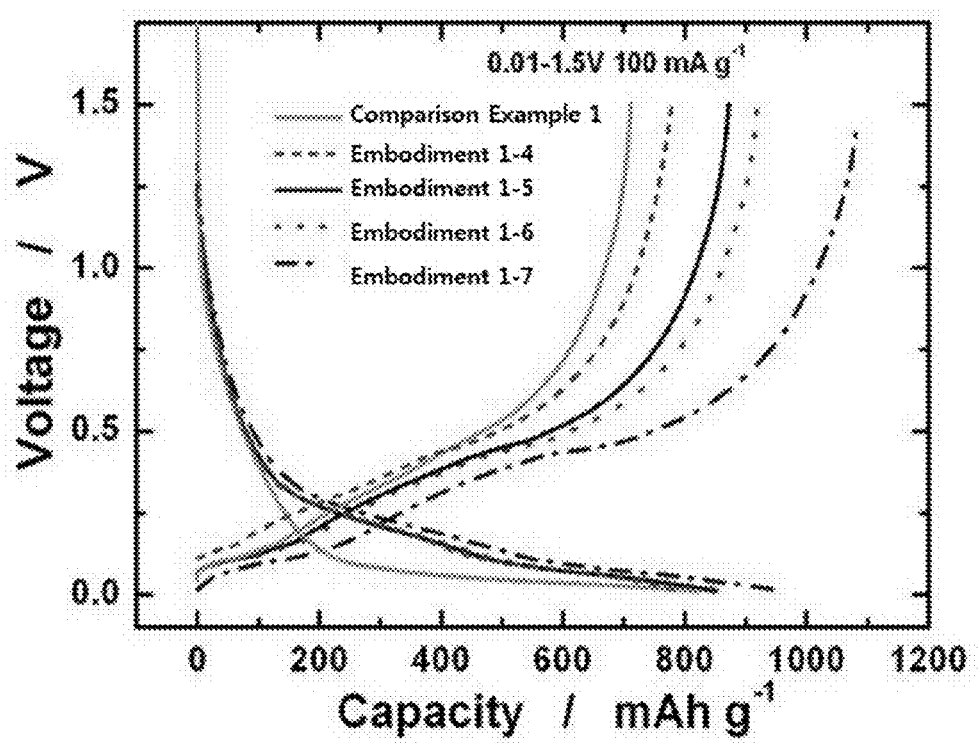
FIG. 3 shows measurement results of charge/discharge characteristics of lithiated silicon-carbon composite electrodes manufactured according to embodiments 1-4, 1-5, 1-6 and 1-7 of the present invention and the comparison example 1.

As shown in FIG. 3, the silicon-carbon composite has a sufficient discharge capacity after the lithiation is performed for a certain time. In addition, it is confirmed that the discharge capacity increases as the applying time of the pressure for the lithiation increases. Thus, it is confirmed that a completely lithiated silicon-carbon composite can be substituted for a lithium metal anode so as to be applied to an electrochemical device.

[Manufacture Example 2] Manufacture of Lithium-Sulfur Cell Including Lithiated Silicon-Carbon Composite Electrode A lithiated silicon-carbon composite electrode was manufactured by the same method as the electrode of the embodiment 1-7.

A cathode used a carbon-sulfur composite disclosed in the Korean Patent Application No. 10-2011-0028246 filed by the present inventor. In more detail, a hard carbon ball and sulfur were mixed with each other at a mass ratio of 1:5, and the mixture was first-thermally treated in an argon (Ar) atmosphere at 150° C. for 7 hours to fill sulfur into the inside of the hard carbon ball. Thereafter, the hard carbon ball filled with sulfur was cooled to a room temperature and then was thermally treated for 2 hours while applying 1 MPa thereto. Thus, the carbon-sulfur composite of which the inside was filled with sulfur was manufactured.

A 2032 coin-type cell was manufactured using the carbon-sulfur composite having the inside filled with sulfur as the cathode, using the lithiated silicon-carbon composite electrode manufactured in the embodiment 1-7 as an anode, and using (TEGDME)$_4$LiCF$_3$SO$_3$ as an electrolyte.

Figure 4:
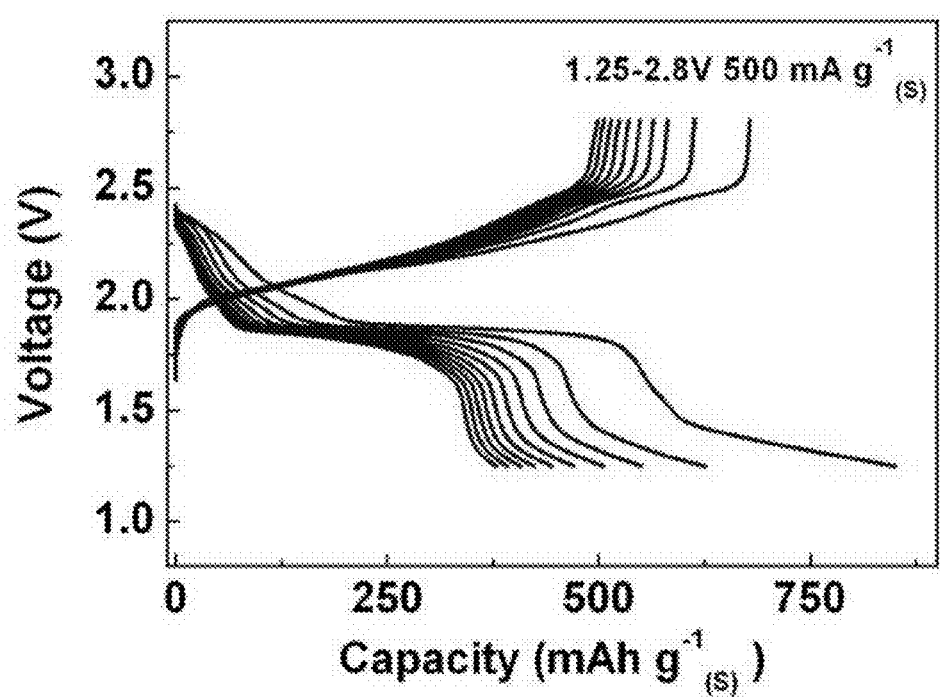
FIG. 4 shows measurement results of charge/discharge characteristics of a lithium-sulfur cell using the lithiated silicon-carbon composite electrode manufactured according to the embodiment 1-7 of the present invention.

[Experimental Example 4] Measurement of Charge/Discharge Capacity of Lithium-Sulfur Cell Using Lithiated Silicon-Carbon Composite Electrode The complete cell using the lithiated silicon-carbon composite electrode manufactured in the embodiment 1-7 as the anode and using the carbon-sulfur composite having the inside filled with sulfur as the cathode was charged and discharged between 1.25 V to 2.8 V under a condition of 500 mA g$^{-1}$, and the results were shown in FIG. 4.

As shown in FIG. 4, it is confirmed that the lithiated silicon-carbon composite electrode sufficiently acts as the anode of the lithium-sulfur cell.

[Embodiment 2] Manufacture of Lithiated Tin-Carbon Composite Electrode

[Manufacture of Tin-Carbon Composite]

Resorcinol (Aldrich) of 28 mmol was mixed with formaldehyde (an aqueous solution of a concentration of 37 wt %, Aldrich) of 120 mmol, and a sodium carbonate catalyzer was added into the mixture. At this time, a molar ratio of the sodium carbonate catalyzer to resorcinol was 45:100. The obtained mixed solution was mixed at 75° C. for 1 hour to obtain a gel-type mixture. The obtained gel-type mixture was aged at a room temperature for about 24 hours. The mixture obtained by aging was cleaned by water and ethanol to remove sodium carbonate. The obtained product was immersed in a tributylphenyltin (Aldrich) solution (solvent: water, concentration: 37 wt %) for a day. Thereafter, a thermal treatment was performed at 700° C. for 2 hours to manufacture a tin-carbon composite.

[Manufacture of Lithiated Tin-Carbon Composite Electrode]

The manufactured tin-carbon composite, a super P carbon black conductive material, and a poly(vinylidene fluoride) binder were mixed with each other at a weight ratio of 80:10:10 in an N-methylpyrrolidone solvent to manufacture a tin-carbon composite slurry.

The tin-carbon composite slurry was casted on copper foil, and an obtained product was dried in an oven at 100° C. for 2 hours and then was dried under vacuum for 12 hours or more.

The vacuum-dried product was cut to have an appropriate size, and a lithium metal was laid thereon. Thereafter, an electrolyte was uniformly sprinkled on the lithium metal. Here, the electrolyte included a mixture solvent of ethylene carbonate and dimethyl carbonate (a volume ratio of 3:7) and 1.2M $LiPF_6$ dissolved in the mixture solvent.

Next, a pressure of 0.5 kg/cm² was applied to the obtained product for a half hour, and then, the lithium metal was carefully removed to manufacture the lithiated tin-carbon composite electrode.

[Manufacture Example 3] Manufacture of Half-Cell Including Lithiated Tin-Carbon Composite Electrode A half-cell of a CR2032 size was manufactured using the lithiated tin-carbon composite electrode manufactured in the embodiment 2 as an anode and using the same cathode and the same electrolyte as described in the manufacture example 1. The electrolyte included the mixture solvent of ethylene carbonate and dimethyl carbonate (the volume ratio of 3:7) and 1.2M $LiPF_6$ dissolved in the mixture solvent.

[Manufacture Example 4] Manufacture of Lithium-Air Cell Including Lithiated Tin-Carbon Composite Electrode A 2032 coin-type cell was manufactured using the lithiated tin-carbon composite electrode of the embodiment 2 as an anode, using a gas diffusion layer (GDL) coated with super P as an air electrode, and using (TEGDME)$_4$LiCF$_3$SO$_3$ as an electrolyte.

[Experimental Example 5] Measurement of Charge/Discharge Capacity of Half-Cell Including Lithiated Tin-Carbon Composite Electrode A charge/discharge test was performed twice to the half-cell manufactured in the manufacture example 3 from 2.0V to 0.01V under a condition of 100 mA g$^{-1}$. Charge/discharge results obtained by a first charge/discharge test were shown in FIG. 5, and charge/discharge results obtained by a second charge/discharge test were shown in FIG. 6.

Figure 5:
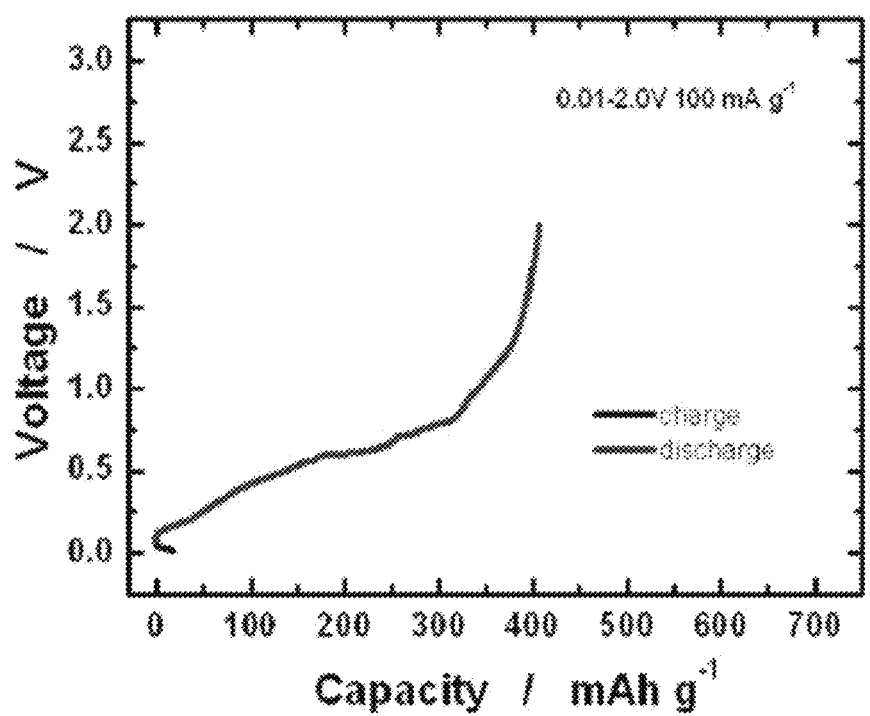
FIG. 5 shows a measurement result of an initial charge/discharge characteristic of a lithiated tin-carbon composite electrode manufactured according to an embodiment 2 of the present invention.

As shown in FIG. 5, the half-cell manufactured in the manufacture example 3 had a charge capacity of 17.4 mAh/g and a discharge capacity of 407.1 mAh/g when the charge/discharge test was performed once. Thus, the half-cell was hardly charged since lithium existed previously in an active material, but the discharge capacity was excellent. In addition, an initial open circuit voltage (OCV) is about 0.05V, and thus, it is confirmed that lithium ions existed previously in the active material.

Figure 6:
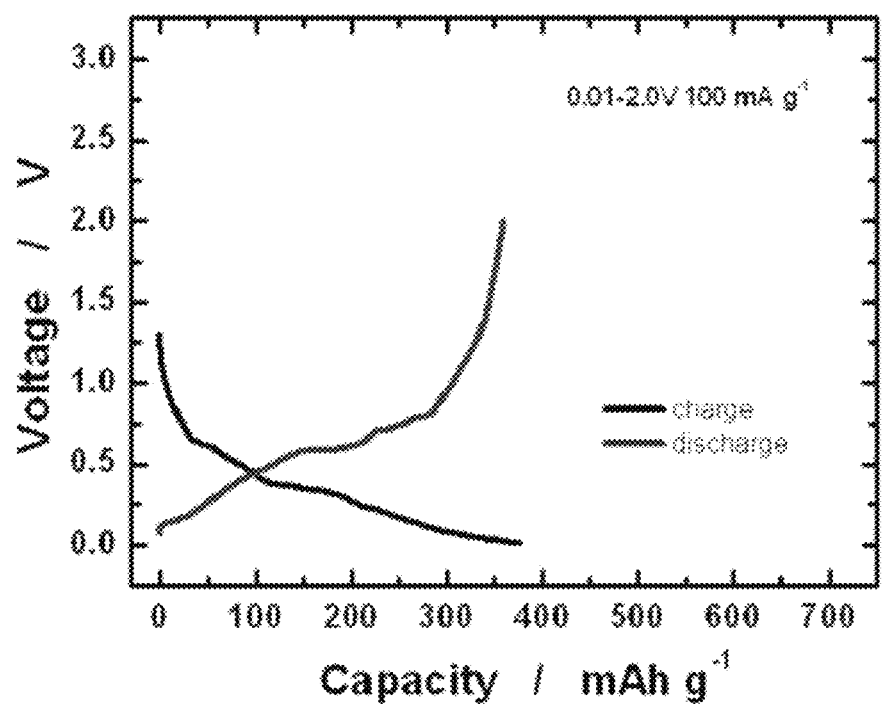
FIG. 6 shows a measurement result of a second charge/discharge characteristic of the lithiated tin-carbon composite electrode manufactured according to the embodiment 2 of the present invention.

Furthermore, as shown in FIG. 6, the half-cell including the lithiated tin-carbon composite electrode of the manufacture example 3 had a charge capacity of 375.0 mAh/g and a discharge capacity of 359.7 mAh/g when the charge/discharge test was performed twice. Thus, the half-cell is enough to act as a battery.

Figure 7:
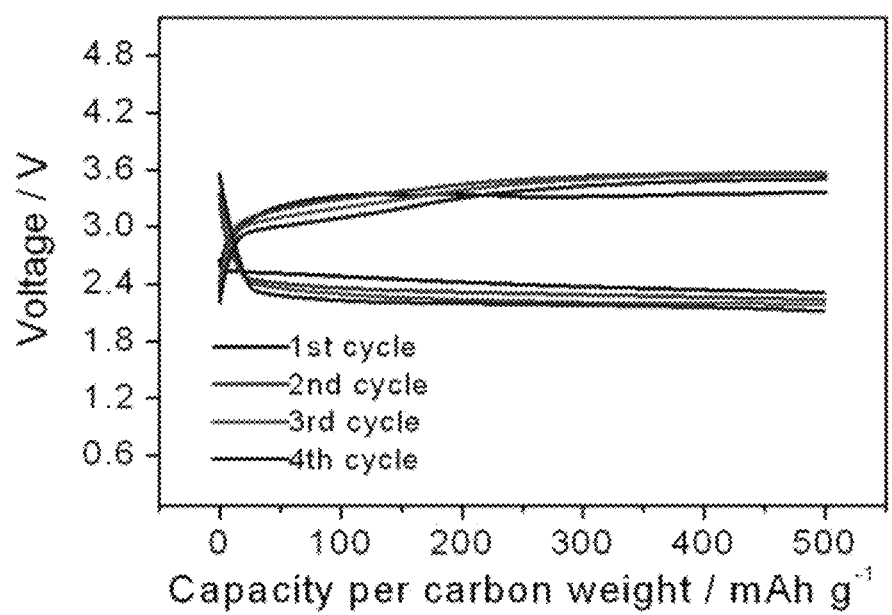
FIG. 7 shows measurement results of charge/discharge characteristic of a lithium-air cell using the lithiated tin-carbon composite electrode manufactured according to the embodiment 2 of the present invention.

[Experimental Example 6] Measurement of Charge/Discharge Capacity of Lithium-Air Cell Including Lithiated Tin-Carbon Composite Electrode A charge/discharge test was performed to the lithium-air cell using the lithiated tin-carbon composite electrode manufactured in the manufacture example 4, and the results were shown in FIG. 7.

As shown in FIG. 7, the lithium-air cell using the lithiated tin-carbon composite electrode of the manufacture example 4 has charge/discharge capacities of 500 mAh/g and a discharge potential of about 2.5V. Thus, the lithium-air cell is enough to act as a battery.

INDUSTRIAL APPLICABILITY

In the lithiated metal-carbon composite electrode according to the present invention, the lithium is alloyed with the metal and is inserted into a crystal structure of carbon to form the composite having a stable structure. Thus, a volume of the metal is slightly varied, so a cycle characteristic may not be deteriorated and charge/discharge capacities may be improved. In addition, the lithiated metal-carbon composite electrode may control an irreversible capacity during initial charging/discharging and may be substituted for an unsafe lithium metal anode.

What is claimed is:

1. A method for manufacturing a lithiated metal-carbon composite electrode, the method comprising:
   preparing a metal-carbon composite;
   mixing the metal-carbon composite, a conductive material, and a binder with a solvent to form slurry and coating a collector with the slurry;
   stacking lithium on the collector coated with the slurry including the metal-carbon composite;
   applying a pressure to the collector, on which the lithium is stacked, while adding a solution to the collector, and removing the lithium stacked on the collector after applying the pressure to the collector.

2. The method of claim 1, wherein the metal-carbon composite is a composite of carbon and a metal selected from a group consisting of Mg, Ca, Al, Si, Ge, Sn, Pb, As, Bi, Ag, Au, Zn, Cd, and Hg.

3. The method of claim 1, wherein the metal-carbon composite is a silicon-carbon composite or a tin-carbon composite.

4. The method of claim 1, wherein the lithium has a sheet shape, and a thickness of the lithium is equal to or greater than 50 μm.

5. The method of claim 1, wherein the pressure applied to the lithium is in a range of 300 N/m² to 3500 N/m².

6. The method of claim 1, wherein the solution includes lithium salt and an electrolyte.

7. The method of claim 6, wherein the lithium salt includes at least one selected from a group consisting of $LiBF_4$, $LiClO_4$, $LiPF_6$, $LiAsF_6$, $LiCF_3SO_3$, $Li(CF_3SO_2)_2N$, $LiC_4F_9SO_3$, $Li(CF_3SO_2)_3C$, and $LiBPh_4$,
   wherein the solution includes an organic solvent and an ionic solvent,
   wherein the organic solvent includes at least one selected from a group consisting of ethylene carbonate (EC), propylene carbonate (PC), dimethyl carbonate (DMC), diethyl carbonate (DEC), ethyl methyl carbonate (EMC), 1,2-dimethoxyethane (DME), gamma-butyrolactone (GBL), tetrahydrofuran (THF), 1,3-dioxolan (DOXL), dimethyl ether (DEE), methyl propionate (MP), sulfolane (S), dimethylsulfoxide (DMSO), acetonitrile (AN), and tetraethyleneglycol dimethylether (TEGDME), and wherein the ionic solvent includes at least one selected from a group consisting of 1-ethyl-3-methylimidazolium (EMI)-$(CF_3SO_2)_2N$, 1-butyl-3-methylimidazolium (BMI)-$(CF_3SO_2)_2N$, 1-hexyl-3-methylimidazolium (HMI)-$(CF_3SO_2)_2N$, 1-ethyl-3-methylimidazolium(EMI)-$PF_6$, 1-butyl-3-methylimidazolium (BMI)-$PF_6$, 1-hexyl-3-methylimidazolium (HMI)-$PF_6$, 1-ethyl-3-methylimidazolium(EMI)-$BF_4$, 1-butyl-3-methylimidazolium(BMI)-$BF_4$, 1-hexyl-3-methylimidazolium(HMI)-$BF_4$, 1-ethyl-3-methylimidazolium(EMI)-$CF_3SO_3$, 1-butyl-3-methylimidazolium(BMI)-$CF_3SO_3$, and 1-hexyl-3-methylimidazolium(HMI)-$CF_3SO_3$.

8. A lithiated metal-carbon composite electrode manufactured by claim 1.

9. The lithiated metal-carbon composite electrode of claim 8, wherein a portion of the lithium and the metal are formed into an alloy, and wherein the rest of the lithium is inserted into a carbon crystal structure.

10. An electrochemical device comprising the lithiated metal-carbon composite electrode of claim 9.

11. The electrochemical device of claim 10, wherein the electrochemical device is a lithium-sulfur battery, a lithium-air battery, or a lithium ion battery.

12. The electrochemical device of claim 10, wherein the electrochemical device is a lithium-air battery including a polymer composite electrolyte or a liquid electrolyte.

13. The electrochemical device of claim 12, wherein the polymer composite electrolyte comprises: a film formed of a first lithium salt and a polymer; and an ionic conductive solvent impregnated in the film, wherein the ionic conductive solvent includes a second lithium salt and an organic solvent, and wherein the organic solvent includes tetraethyleneglycoldimethylether, ethylene glycoldimethacrylate, polyethylene glycol, polyethylene glycoldialkyl ether, polyalkylglycoldialkyl ether, or any combination thereof.

14. The electrochemical device of claim 12, wherein the liquid electrolyte is expressed by a formula $R^1(CR^3_2CR^4_2O)_n R^2$, where "n" is between 2 to 10, and each of "$R^1$" and "$R^2$" is independently selected from a group consisting of H, alkyl, cycloalkyl, aryl, heterocyclyl, heteroaryl, alkoxy, silyl, substituted alkyl, substituted cycloalkyl, substituted aryl, substituted heterocyclyl, substituted heteroaryl, substituted alkoxy, substituted silyl, and a halogen.

15. The electrochemical device of claim 12, wherein each of "$R^3$" and "$R^4$" is independently selected from a group consisting of H, a halogen, alkyl, cycloalkyl, aryl, substituted alkyl, and substituted aryl.

16. The electrochemical device of claim 12, wherein the liquid electrolyte includes tetraethyleneglycoldimethylether, ethylene glycoldimethacrylate, polyethylene glycol, polyethylene glycoldialkyl ether, polyalkylglycoldialkyl ether, or any combination thereof.

* * * * *